US011837807B2

(12) United States Patent
Rao

(10) Patent No.: US 11,837,807 B2
(45) Date of Patent: Dec. 5, 2023

(54) CONTACT-MAKING DEVICE FOR MAKING ELECTRICAL CONTACT WITH A PRINTED CIRCUIT BOARD BY A COIL FORMER FOR A SOLENOID VALVE FOR A BRAKE DEVICE FOR A VEHICLE, SOLENOID VALVE COMPRISING A CONTACT-MAKING DEVICE AND METHOD FOR PRODUCING A CONTACT-MAKING DEVICE

(71) Applicant: Knorr-Bremse Systeme fuer Nutzfahrzeuge GmbH, Munich (DE)

(72) Inventor: Radhakrishna Rao, Stuttgart (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 474 days.

(21) Appl. No.: 17/279,533

(22) PCT Filed: Sep. 16, 2019

(86) PCT No.: PCT/EP2019/074620
§ 371 (c)(1),
(2) Date: Mar. 24, 2021

(87) PCT Pub. No.: WO2020/064382
PCT Pub. Date: Apr. 2, 2020

(65) Prior Publication Data
US 2021/0344129 A1 Nov. 4, 2021

(30) Foreign Application Priority Data
Sep. 28, 2018 (DE) ..................... 10 2018 123 995.5

(51) Int. Cl.
*H01R 13/17* (2006.01)
*H01R 12/70* (2011.01)
(Continued)

(52) U.S. Cl.
CPC ........ *H01R 12/7082* (2013.01); *B60T 8/3675* (2013.01); *H01R 13/17* (2013.01); *H01R 13/2421* (2013.01); *H01R 2201/26* (2013.01)

(58) Field of Classification Search
CPC . H01R 13/17; H01R 13/2421; H01R 2201/26
See application file for complete search history.

(56) References Cited

U.S. PATENT DOCUMENTS 6,388,885 B1 * 5/2002 Alexander ............ H01R 13/33
439/840
2004/0232934 A1 11/2004 Sinclair
(Continued)

FOREIGN PATENT DOCUMENTS

CN 101030678 A 9/2007
CN 102366677 A 3/2012
(Continued)

OTHER PUBLICATIONS

International Search Report for PCT/EP2019/074620 dated Jan. 8, 2020.

*Primary Examiner* — Sherman Ng
(74) *Attorney, Agent, or Firm* — NORTON ROSE FULBRIGHT US LLP; Gerard Messina

(57) ABSTRACT

A contacting device for electrical contacting of a printed circuit board with a coil body for a solenoid valve for a brake device for a vehicle, including: a helical electrically conductive contact spring which is configured to be contacted or being contactable with the printed circuit board at a first spring end and configured to be contacted or being contactable with the coil body at a second spring end, situated opposite the first spring end, to enable a resilient electrical contacting of the printed circuit board with the coil body; and a pin which is receivable or has been received in an interior space of the contact spring, the pin being configured to support the contact spring from the interior space in a (Continued)

received state received in the interior space. Also described are a related solenoid valve, method, and computer readable storage medium.

11 Claims, 2 Drawing Sheets

(51) Int. Cl.
*B60T 8/36* (2006.01)
*H01R 13/24* (2006.01)

(56) References Cited

U.S. PATENT DOCUMENTS

| | | |
|---|---|---|
| 2009/0250998 A1 | 10/2009 | Hinz et al. |
| 2016/0276770 A1* | 9/2016 | Hein .................. H01R 12/57 |

FOREIGN PATENT DOCUMENTS

| | | |
|---|---|---|
| CN | 203166171 U | 8/2013 |
| CN | 105706308 A | 6/2016 |
| CN | 108080828 A | 5/2018 |
| DE | 102005023837 A1 | 12/2006 |
| DE | 102012014407 A1 | 1/2014 |
| EP | 2846415 A1 | 3/2015 |
| EP | 3109951 A1 | 12/2016 |
| EP | 3236724 A1 | 10/2017 |
| JP | H40108868 U | 9/1992 |
| WO | 2013168711 A1 | 11/2013 |

\* cited by examiner

CONTACT-MAKING DEVICE FOR MAKING ELECTRICAL CONTACT WITH A PRINTED CIRCUIT BOARD BY A COIL FORMER FOR A SOLENOID VALVE FOR A BRAKE DEVICE FOR A VEHICLE, SOLENOID VALVE COMPRISING A CONTACT-MAKING DEVICE AND METHOD FOR PRODUCING A CONTACT-MAKING DEVICE

FIELD OF THE INVENTION

The present application relates to a contacting device for electrical contacting of a printed circuit board with a coil body for a solenoid valve for a brake device for a vehicle, to a solenoid valve with a contacting device, and to a method for producing a contacting device.

BACKGROUND INFORMATION

In order to be able to supply a solenoid with current, diverse components are employed in order to establish an electrical contact between a printed circuit board and a coil body or coil.

Patent document EP 3 109 951 A1 discusses an electrical modular unit with electrically conducting contact springs which are received in an insulating housing.

SUMMARY OF THE PRESENT INVENTION

Against this background, an object of the present application is to create an improved contacting device for electrical contacting of a printed circuit board with a coil body for a solenoid valve for a brake device for a vehicle, to create a solenoid valve with an improved contacting device, and also to create a method for producing an improved contacting device.

This object may be achieved by a contacting device for electrical contacting of a printed circuit board with a coil body for a solenoid valve for a brake device for a vehicle, by a solenoid valve for a brake device for a vehicle, and also by a method for producing a contacting device, according to the main descriptions herein.

The advantages that can be obtained with the application being presented consist in that a resilient electrical contact is capable of being established between a printed circuit board and a magnetic coil, said contact nevertheless being supported or guided in very stable manner using only very little material.

A contacting device is presented for electrical contacting of a printed circuit board with a coil body for a solenoid valve for a brake device for a vehicle. The contacting device exhibits a contact spring and a pin. The contact spring has been formed in helical and electrically conductive manner and configured to be contacted or capable of being contacted with the printed circuit board at a first spring end and configured to be contacted or capable of being contacted with the coil body at a second spring end, situated opposite the first spring end, in order to enable a resilient electrical contacting of the printed circuit board with the coil body. The pin is capable of being received or has been received in an interior space of the contact spring, the pin being configured to support the contact spring from the interior space in a received state received in the interior space.

A magnetic coil or at least one component of the magnetic coil—for instance, the coil or at least one coil portion or a coil housing or at least one coil-housing portion—may be understood as the coil body. The contact spring may have been cylindrically formed or wound at least in one portion. The so-called pin may, for instance, have been configured to be tapering at a free end, for instance in order to be capable of being inserted, pressed or screwed into the coil body. The contacting device presented herein advantageously makes a stable contact possible between the printed circuit board and the coil body, since the contact spring which is arranged or capable of being arranged between the printed circuit board and the coil body is stabilized by the pin. In this regard, the pin may have been configured to support the contact spring in the axial and/or lateral or radial direction(s) from the interior space. For instance, an outer surface of the pin is able to contact the contact spring in the received state.

It is an advantage if a first portion of the contact spring has a first radius and a second portion of the contact spring has a second radius, in which case the first radius and the second radius may have different magnitudes.

The first spring portion may be a portion of the contact spring facing toward the first spring end and/or encompassing the first spring end. The second spring portion may be a portion of the contact spring facing toward the second spring end and/or encompassing the second spring end. For instance, the first radius may be larger than the second radius. A contact spring of such a type, which is narrower in one region, may be an advantage for reasons of structural configuration or space.

The pin may form at least one step, in which case, in particular, the step may have been formed circumferentially on the pin. A pin of such a type may advantageously have been, or be, positively received in the interior space of the contact spring if the contact spring has the differing radii described above. In this regard, the step may have been arranged in the region of a connecting portion between the first spring portion and the second spring portion. For instance, the pin may have been arranged and/or configured to contact and/or support the contact spring both axially and radially in the region of the step.

In the received state, the pin may have been configured and/or arranged to transmit a force to the coil body and/or to the printed circuit board in a tensioned state of the contact spring between the printed circuit board and the coil body. In this regard, the step is able to press or be pressed onto the second portion, for instance in the axial direction. In this way, a requisite force or requisite forces can act or be caused to act on the printed circuit board and/or on the coil body.

It is an advantage, furthermore, if the pin exhibits an electrically insulating material, in particular a synthetic material. For instance, at least the outer surface of the pin facing toward the contact spring may exhibit the synthetic material. In this way, the contact spring may have been insulated with respect to a housing.

According to an advantageous practical form, the contacting device exhibits, in addition, an electrically conductive welding element which is capable of being arranged or is arranged in or on the coil body, in which case, in particular, the welding element is arranged or capable of being arranged as a stop for the second end of the contact spring and/or is configured to insert an end of the pin. This welding element may be a welding sleeve which is capable of being welded or has been welded to an electrical lead which has been recessed or connected into the coil body. The welding element may exhibit a passage opening, into which the end of the pin has been axially inserted or is capable of being axially inserted.

According to one practical form, the contacting device may also exhibit the coil body and/or the printed circuit board. The coil body may exhibit a recess in which the second spring end and/or the welding element and/or the pin end are arranged or capable of being arranged. A recess of such a type can create a stable, positive receiving option on the coil body. The recess may form an undercut for secure retention of the welding element.

A solenoid valve exhibits a contacting device which has been constructed in one of the variants described previously. A solenoid valve of such a type may have been configured and/or formed for use in a brake device for a vehicle. Thanks to the contacting device, such a solenoid valve—for instance, a brake valve—also advantageously realizes the advantages, described above, of the contacting device.

A method for producing a contacting device for electrical contacting of a printed circuit board with a coil body for a solenoid valve for a brake device for a vehicle includes a provision step and a receiving step. In the provision step, a helical electrically conductive contact spring, which is configured to be contacted or capable of being contacted with the printed circuit board at a first spring end and configured to be contacted or capable of being contacted with the coil body at a second spring end, situated opposite the first spring end, in order to enable a resilient electrical contacting of the printed circuit board with the coil body, and a pin, which is capable of being received in an interior space of the contact spring, are provided, the pin being configured to support the contact spring from the interior space in a received state received in the interior space. In the receiving step, the pin is received into the interior space of the contact spring.

In the receiving step, the pin can be inserted into the interior space, or the contact spring can be pulled over the pin.

The method may, in addition, have an electrical-contacting step, in which the first spring end is electrically contacted with the printed circuit board and/or the second spring end is electrically contacted with the coil body. The electrical-contacting step can be carried out before the receiving step and/or after the receiving step.

Also advantageous is a computer-program product or computer program with program code which may have been stored on a machine-readable carrier or storage medium such as a semiconductor memory, a hard-disk memory or an optical memory and is used for implementing, realizing and/or triggering the steps of the method according to one of the practical forms described above, particularly when the program product or program is executed on a computer or appliance.

Embodiments of the application being presented herein will be elucidated in more detail in the following description with reference to the figures.

DETAILED DESCRIPTION

In the following description of favorable embodiments of the present application, identical or similar reference symbols will be used for the elements represented in the various figures and for elements having a similar action, in which connection a repeated description of these elements will be dispensed with.

If an embodiment includes an "and/or" coupling between a first feature and a second feature, this is to be read in such a way that the embodiment according to one practical form exhibits both the first feature and the second feature, and according to another practical form exhibits either only the first feature or only the second feature.

Figure 1:
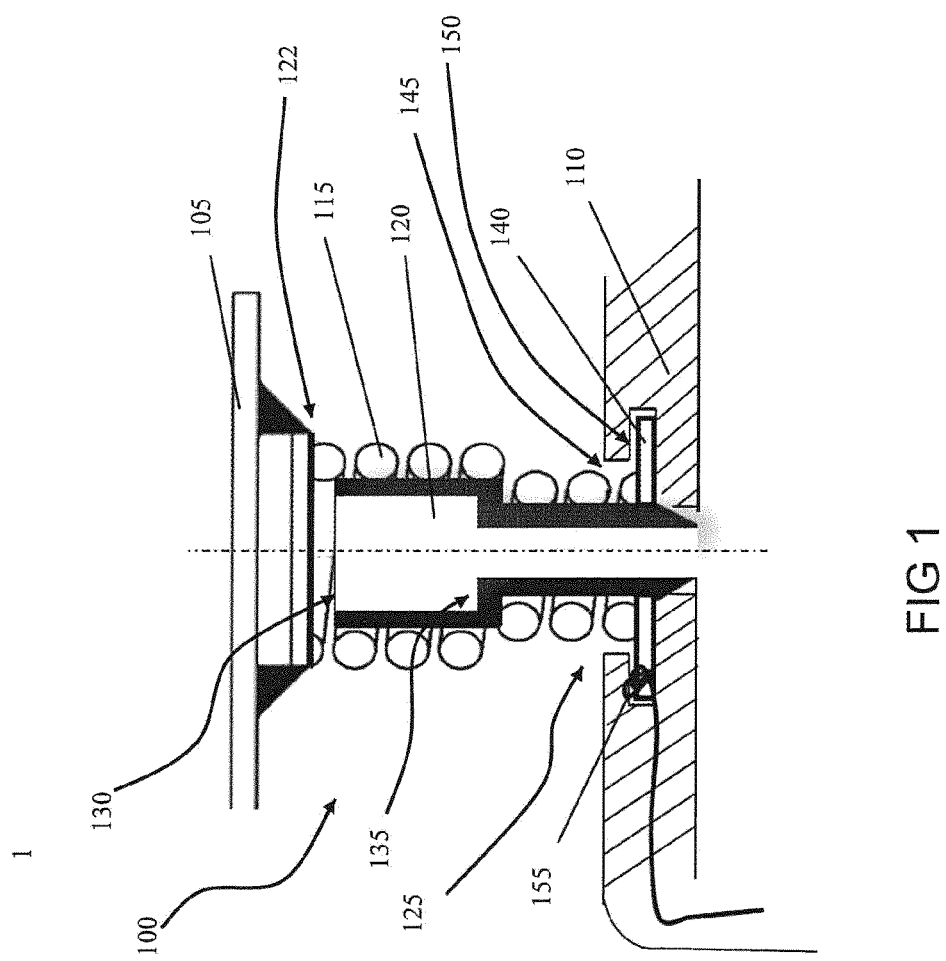
FIG. 1 shows a lateral schematic cross-sectional representation of a contacting device for electrical contacting of a printed circuit board with a coil body for a solenoid valve for a brake device for a vehicle, according to an embodiment.

FIG. 1 shows a lateral schematic cross-sectional representation of a contacting device 100 for electrical contacting of a printed circuit board 105 with a coil body 110 for a solenoid valve for a brake device for a vehicle, according to an embodiment.

The contacting device 100 contacts the printed circuit board 105 electrically with the coil body 110 and is configured to be used for a solenoid valve for a brake device for a vehicle. The contacting device 100 exhibits a contact spring 115 and a pin 120. The contact spring 115 has been formed in helical and electrically conductive manner and configured to be contacted or capable of being contacted with the printed circuit board 105 at a first spring end 122 and configured to be contacted or capable of being contacted with the coil body 110 at a second spring end 125, situated opposite the first spring end 122, in order to enable a resilient electrical contacting of the printed circuit board 105 with the coil body 110. The pin 120 is capable of being received or has been received in an interior space 130 of the contact spring 115, the pin 120 being configured to support the contact spring 115 from the interior space 130 in a received state received in the interior space 130.

According to this embodiment, in the received state the pin 120 has been received in the interior space 130 of the contact spring 115, and the first spring end 122 has been contacted with the printed circuit board 105, and the second spring end 125 has been contacted with the coil body 110.

According to this embodiment, a first portion of the contact spring 115 has a first radius and a second portion of the contact spring 115 has a second radius, the first radius and the second radius having different magnitudes.

According to this embodiment, the first spring portion encompasses the first spring end 122, and the second spring portion encompasses the second spring end 125. According to this embodiment, the first radius is be larger than the second radius.

According to this embodiment, the pin 120 forms a step 135 which, according to this embodiment, has been formed circumferentially on the pin 120. According to this embodiment, the step 135 is arranged in the region of a connecting portion of the contact spring 115 between the first spring portion and the second spring portion. According to this embodiment, a first pin portion received in the first spring portion has a larger radius than a second pin portion received in the second spring portion.

In a tensioned state of the contact spring 115, the pin 120 in the received state is configured and/or arranged to transmit a force between the printed circuit board 105 and the coil body 110 to the coil body 110 and/or to the printed circuit board 105. According to this embodiment, the pin 120 exhibits an electrically insulating material that, according to this embodiment, exhibits a synthetic material.

Optionally, according to this embodiment the contacting device 100 exhibits, in addition, an electrically conductive welding element 140 which is capable of being arranged or is arranged in or on the coil body 110. According to this embodiment, the welding element 140 is arranged or capable of being arranged as a stop for the second end 125 of the contact spring 115 and/or is configured to insert an end of the pin 120.

According to this embodiment, the welding element 140 has been received in a recess 145 of the coil body 110. According to this embodiment, this recess 145 forms an undercut 150 in which one end of the welding element 140 is positively received. According to this embodiment, the longitudinal axis of the welding element 140 extends within the recess 145 at right angles to the longitudinal axis of the pin 120. According to this embodiment, the pin 120 is arranged at right angles to the longitudinal axis of the welding element, guided through the welding element 140 through a passage opening in the welding element 140. The second spring end 145 has been received into the recess 145 as far as a limitation by the welding element 140 which constitutes the stop for the second spring end 145.

According to this embodiment, at at least one end the welding element 140 exhibits a welded joint 155 with a copper wire which has been received in the coil body 110 or arranged on the coil body 110.

According to an embodiment, the printed circuit board 105 and/or the coil body 110 in one of the variants described above are/is part of the contacting device 100.

In the following, details of the contacting device 100 that have already been described will be described once again using different words:

The contacting device 100 presented herein realizes an electrical contact system or contact support system for solenoid valves. According to this embodiment, the contacting device 100 is configured to be used with a solenoid valve for a brake device of a truck. In this regard, the contacting device 100 advantageously makes an inexpensive contacting system possible which connects the printed circuit board 105 electrically to one or more magnetic coils of the coil body 110 when current is supplied. Installation of the contacting device 100 is easy to implement. Additional housing elements or special guiding or supporting elements on or in the region of the printed circuit board 105 are not necessary, thanks to the contacting device 100. By reason of the welding element 140, a welding process is advantageously made possible which, in comparison with a possible soldering process, enables a more stable connection, since the components to be welded together are liquefied by very high temperatures in the course of welding and subsequently enter into a firmer integral connection than in the case of soldering. In comparison with a possible soldering of the coil to a winding region which has been wound around an electrically conductive pin, a more resistant connection results by virtue of the contacting device 100 presented herein, since according to an embodiment the contact spring 115 has merely been clamped flexibly between the printed circuit board 105 and the welding element 140. According to an alternative embodiment, the second spring end 125 has been welded to the welding element 140, as a result of which a very firm connection is guaranteed.

The resilient contacting device 100 is advantageously configured to compensate for dimensional deviations such as variations in size. This is helpful, since if at least one electrical pin comes into operation a relatively high degree of position-monitoring or positional control is necessary. In this regard, the step 135 and/or the stepped contact spring 115 meet(s) configuration requirements and advantageously make(s) a reduced space requirement possible. The contact spring 115 is advantageously guided by the pin 120 which, in addition, insulates the contact spring 115 from a housing. According to this embodiment, the pin 120 guides and supports the contact spring 115 in the axial and lateral or radial directions. Thanks to the contacting device 100, in addition a requisite initial tension between the printed circuit board 105 and the coil body 110 is ensured.

According to this embodiment, the step-shaped contact spring 115 presses or tightens against the printed circuit board 105 and the welding element 140 which is fixed on or in the coil body 110. According to this embodiment, the welding element 140 takes the form of a welding sleeve. The pin 120 exhibiting the plastic material supports the contact spring 115 axially and laterally. In this regard, the pin 120 in the form of a guide pin is configured to support the contact spring 115 from an inner side. Since the contact spring 115 exhibits a step, the pin 120 is pressed against this step, as a result of which sufficient requisite forces act on the welding element 140 and on the printed circuit board 105. By virtue of the pin 120 arranged in the contact spring 115, advantageously less construction material is required in comparison with a possible outer guide housing around the contact spring 115. An outer housing of such a type is not necessary. A guide rail along or on the printed circuit board 115 is also not necessary. Expressed concisely, the contacting device 100 presented herein can be produced easily and favorably and is also easy to install. In this regard, the contacting device 100 advantageously needs only very few components and can nevertheless compensate for dimensional deviations. No special structure and no aids are necessary for transportation, since the contact spring 115 is held by the pin 120. Advantageously, no soldering process is necessary for the production of the contacting device 100.

Figure 2:
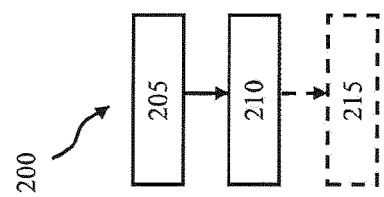
FIG. 2 shows a flowchart of a method for producing a contacting device for electrical contacting of a printed circuit board with a coil body for a solenoid valve for a brake device for a vehicle, according to an embodiment.

FIG. 2 shows a flowchart of a method 200 for producing a contacting device for electrical contacting of a printed circuit board with a coil body for a solenoid valve for a brake device for a vehicle, according to an embodiment. It may be a question of one of the variants of a contacting device described in FIG. 1.

The method 200 includes a provision step 205 and a receiving step 210. According to this embodiment, the method 200 optionally includes, in addition, an electrical-contacting step 215.

In the provision step 205, a helical electrically conductive contact spring, which is configured to be contacted or capable of being contacted with the printed circuit board at a first spring end and configured to be contacted or capable of being contacted with the coil body at a second spring end, situated opposite the first spring end, in order to enable a resilient electrical contacting of the printed circuit board with the coil body, and a pin, which is capable of being received in an interior space of the contact spring, are provided, the pin being configured to support the contact spring from the interior space in a received state received in the interior space. In the receiving step 210, the pin is received into the interior space of the contact spring. In the receiving step 210, according to this embodiment the pin is inserted into the interior space or, according to an alternative embodiment, the contact spring is pulled over the pin.

The method 200 has, in addition, the electrical-contacting step 215, in which the first spring end is electrically contacted with the printed circuit board and/or the second spring end is electrically contacted with the coil body.

According to this embodiment, the electrical-contacting step 215 is carried out after the receiving step 210 or, according to an alternative embodiment, before the receiving step 210.

The method steps presented herein can be repeated and can also be carried out in an order other than that described.

The LIST OF REFERENCE SYMBOLS is as follows:

100 contacting device
105 printed circuit board
110 coil body
115 contact spring
120 pin
122 first spring end
125 second spring end
130 interior space
135 step
140 welding element
145 recess
150 undercut
155 welded joint
200 method for producing a contacting device
205 provision step
210 receiving step
215 electrical-contacting step

The invention claimed is:

1. A contacting device for electrical contacting of a printed circuit board with a coil body for a solenoid valve for a brake device for a vehicle, comprising:
a helical electrically conductive contact spring which is configured to be contacted or being contactable with the printed circuit board at a first spring end and configured to be contacted or being contactable with the coil body at a second spring end, situated opposite the first spring end, to enable a resilient electrical contacting of the printed circuit board with the coil body;
a pin which is receivable or has been received in an interior space of the contact spring, the pin being configured to support the contact spring from the interior space in a received state received in the interior space; and
an electrically conductive welding element which is arranged in or on the coil body, the welding element being arranged as a stop for the second end of the contact spring and being configured to insert an end of the pin.

2. The contacting device of claim 1, wherein a first portion of the contact spring has a first radius and a second portion of the contact spring has a second radius, the first radius and the second radius having different magnitudes.

3. The contacting device of claim 1, wherein the pin forms at least one step, the step having been formed circumferentially on the pin.

4. The contacting device of claim 2, wherein the pin in the received state is configured and/or arranged to transmit a force to the coil body and/or to the printed circuit board in a tensioned state of the contact spring between the printed circuit board and the coil body.

5. The contacting device of claim 1, wherein the pin exhibits an electrically insulating material, which includes a synthetic material.

6. The contacting device of claim 1, further comprising: the coil body and/or the printed circuit board.

7. The contacting device of claim 1, wherein the coil body exhibits a recess in which the second spring end and/or the welding element and/or the pin end are/is arranged or capable of being arranged.

8. A solenoid valve, comprising:
a contacting device for electrical contacting of a printed circuit board with a coil body for a solenoid valve for a brake device for a vehicle, including:
a helical electrically conductive contact spring which is configured to be contacted or being contactable with the printed circuit board at a first spring end and configured to be contacted or being contactable with the coil body at a second spring end, situated opposite the first spring end, to enable a resilient electrical contacting of the printed circuit board with the coil body;
a pin which is receivable or has been received in an interior space of the contact spring, the pin being configured to support the contact spring from the interior space in a received state received in the interior space; and
an electrically conductive welding element which is arranged in or on the coil body, the welding element being arranged as a stop for the second end of the contact spring and being configured to insert an end of the pin.

9. A method for producing a contacting device for electrical contacting of a printed circuit board with a coil body for a solenoid valve for a brake device for a vehicle, the method comprising:
providing a helical electrically conductive contact spring, which is configured to be contacted or being contactable with the printed circuit board at a first spring end and configured to be contacted or being contactable with the coil body at a second spring end, situated opposite the first spring end, to enable a resilient electrical contacting of the printed circuit board with the coil body, and a pin which is receivable in an interior space of the contact spring, the pin being configured to support the contact spring from the interior space in a received state received in the interior space;
wherein an electrically conductive welding element is arranged in or on the coil body, the welding element being arranged as a stop for the second end of the contact spring and being configured to insert an end of the pin; and
receiving the pin into the interior space of the contact spring.

10. A non-transitory computer readable storage medium having a computer program, which is executable by a processor, comprising:
a program code arrangement having program code for producing a contacting device for electrical contacting of a printed circuit board with a coil body for a solenoid valve for a brake device for a vehicle, by performing the following:
providing a helical electrically conductive contact spring, which is configured to be contacted or capable of being contacted with the printed circuit board at a first spring end and configured to be contacted or being contactable with the coil body at a second spring end, situated opposite the first spring end, to enable a resilient electrical contacting of the printed circuit board with the coil body, and a pin which is receivable in an interior space of the contact spring, the pin being configured to support the contact spring from the interior space in a received state received in the interior space;
wherein an electrically conductive welding element is arranged in or on the coil body, the welding element being arranged as a stop for the second end of the contact spring and being configured to insert an end of the pin; and
receiving the pin into the interior space of the contact spring.

11. The storage medium of claim 10, wherein a first portion of the contact spring has a first radius and a second portion of the contact spring has a second radius, the first radius and the second radius having different magnitudes.

\* \* \* \* \*